L. WEBBER.
BEARING AND BOX FOR VERTICAL SHAFTS.

No. 191,390. Patented May 29, 1877.

WITNESSES:
E. Wolff
J. H. Scarborough

INVENTOR:
L. Webber
BY
ATTORNEYS.

UNITED STATES PATENT OFFICE.

LEVI WEBBER, OF NORTH VASSALBOROUGH, MAINE.

IMPROVEMENT IN BEARINGS AND BOXES FOR VERTICAL SHAFTS.

Specification forming part of Letters Patent No. 191,390, dated May 29, 1877; application filed April 30, 1877.

*To all whom it may concern:*

Figure 1:
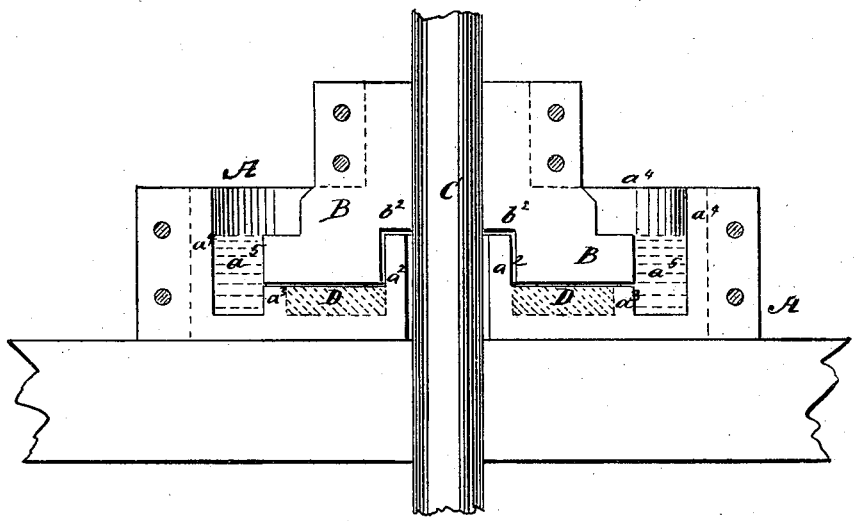
Figure 2:
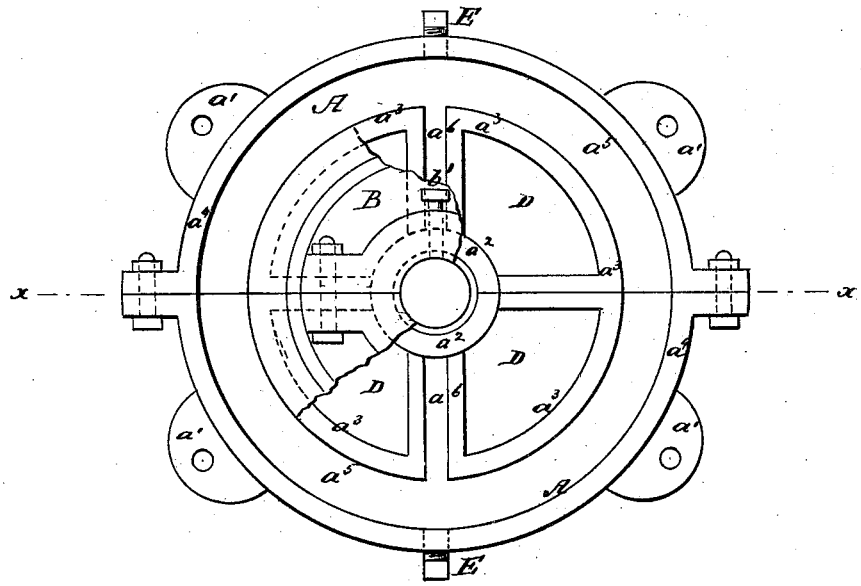

Be it known that I, LEVI WEBBER, of North Vassalborough, in the county of Kennebec and State of Maine, have invented a new and useful Improvement in Bearing and Box for Vertical Shafts, of which the following is a specification:

Figure 1 is a vertical cross-section of my improved bearing and box, taken through the line $x$ $x$, Fig. 2. Fig. 2 is a top view of the same, part of the bearing being broken away to show the construction of the box.

Similar letters of reference indicate corresponding parts.

The object of this invention is to furnish an improved bearing and box for the shafts of water-wheels and other vertical shafts that support great weights, to prevent the steps from wearing or burning out so quick, and which shall be simple in construction and conveniently applied.

The invention consists in the combination of the box, made in two parts bolted together, provided with the lugs or flanges, the inner rim, the chambers to receive the Babbitt metal, the outer rim, the oil-chamber, and the oil-channels, and the bearing, made in two parts, bolted together, and provided with set-screws and a countersink, with each other, to adapt them to be connected with a vertical shaft to support its weight, as hereinafter fully described.

A represents the box, which is made in the form of two semicircular parts, securely bolted to each other, and provided with lugs or flanges $a^1$, to receive the bolts by which it is secured to the supporting-timbers. The box A is provided with a rim, $a^2$, around the hole, through which the shaft C passes, and which is made large enough to allow the said shaft to run free and without friction. In the box A, around the rim $a^2$, are formed shallow chambers $a^3$, to receive Babbitt metal D. The ring-space between the chambers $a^3$ and the outer rim $a^4$ of the box serves as an oil-chamber, $a^5$, and from said oil-chamber $a^5$ gutters or channels $a^6$ lead into the rim $a^2$, to conduct the oil beneath and bring it into contact with the bearing B. The bearing B is also made in two semicircular parts, which are securely bolted together, and are secured to the shaft C by set-screws $b^1$, so that it may be carried around by and with the said shaft in its revolution. The bearing B is countersunk upon its lower side around the hole through which the shaft C passes, to receive the inner rim $a^2$ of the box A. This countersink $b^2$ is made a little larger and deeper than the rim $a^2$, so that there may be no friction between said rim and bearing. The bearing B may have a rim formed around its outer edge to overlap the outer sides of the chambers $a^3$, to keep the shaft steady. The bearing B and box A are connected with the shaft C above the water, and support the said shaft C and its attachments, the step only serving to keep the shaft in place. The old oil is drawn out of the oil-chamber $a^5$, when desired, through holes in the outer rim $a^4$, which holes are closed with screw-plugs E or other convenient stoppers.

Having thus described my invention, I claim as new and desire to secure by Letters Patent—

The combination of the box A, made in two parts, bolted together, provided with the lugs or flanges $a^1$, the inner rim $a^2$, the chambers $a^3$, to receive the Babbitt metal, the outer rim $a^4$, the oil-chamber $a^5$, and the oil-channels $a^6$, and the bearing B, made in two parts, bolted together, and provided with set-screws $b^1$ and a countersink, $b^2$, with each other, to adapt them to be connected with a vertical shaft to support its weight, substantially as herein shown and described.

LEVI WEBBER.

Witnesses:
 ORRICK HAWES,
 JOHN M. WEBBER.